United States Patent [19]

Hirano et al.

[11] 4,272,114
[45] Jun. 9, 1981

[54] IMPACT ABSORBING DEVICE
[75] Inventors: Tomoyuki Hirano, Tokyo; Akira Yamanaka; Koichi Tonai, both of Yokohama, all of Japan
[73] Assignee: Mitsubishi Jidosha Kogyo Kabushiki Kaisha, Tokyo, Japan
[21] Appl. No.: 76,151
[22] Filed: Sep. 17, 1979

Related U.S. Application Data

[62] Division of Ser. No. 860,626, Dec. 14, 1977, Pat. No. 4,190,276.

[30] Foreign Application Priority Data

Dec. 22, 1976 [JP] Japan .................. 51/15533
Feb. 3, 1977 [JP] Japan .................. 52/11265
Jun. 8, 1977 [JP] Japan .................. 52/68270

[51] Int. Cl.³ .............................................. B60R 19/04
[52] U.S. Cl. ........................................ 293/133; 188/1 C
[58] Field of Search ................... 293/132, 133, 134; 188/1 C; 104/254; 280/784, 777

[56] References Cited

U.S. PATENT DOCUMENTS

| | | | |
|---|---|---|---|
| 2,135,749 | 11/1938 | Gullo | 293/133 |
| 3,586,131 | 6/1971 | LeMire | 188/1 C |
| 3,612,223 | 10/1971 | Shiomi | 293/133 |
| 3,848,886 | 11/1974 | Feustel et al. | 293/133 |
| 3,887,223 | 6/1975 | Bez | 188/1 C |
| 3,981,114 | 9/1976 | Chupick | 293/133 |
| 4,031,978 | 6/1977 | Taylor | 293/133 |

Primary Examiner—John J. Love
Assistant Examiner—Ross Weaver
Attorney, Agent, or Firm—Oldham, Oldham, Hudak & Weber Co.

[57] ABSTRACT

An impact absorbing device comprising a hollow polyhedral body formed with a plurality of elongated cutouts in each of its side walls. These cutouts extend in parallel relation in a direction substantially orthogonal with respect to the longitudinal axis of the polyhedral body, and each cutout has one of its longer edges protruding outward and the other longer edge protruding inward. The polyhedral body is subjected to deformation or partial breakage to absorb an impact imparted to a vehicle as when the vehicle collides against another. The device may be combined with a conventional shock absorber to enhance the effect of impact absorption.

11 Claims, 24 Drawing Figures

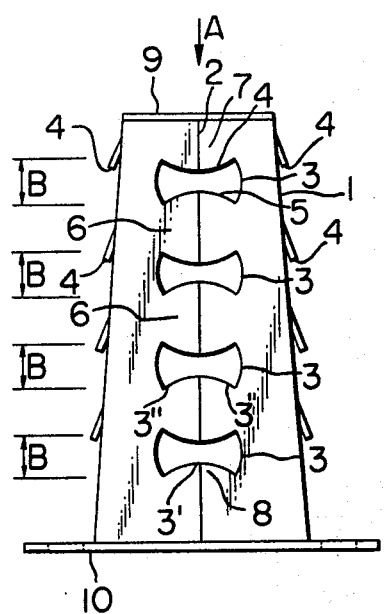
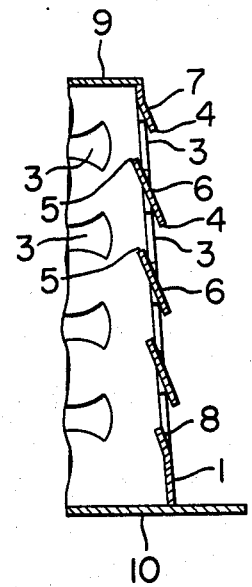
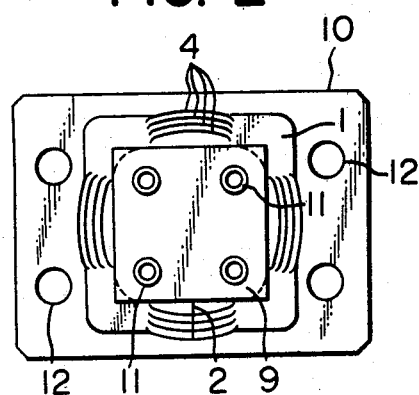
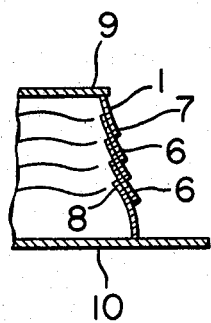
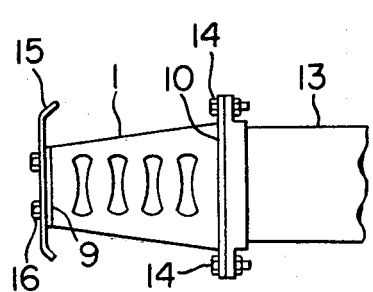
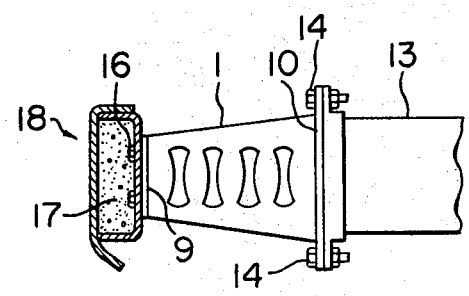

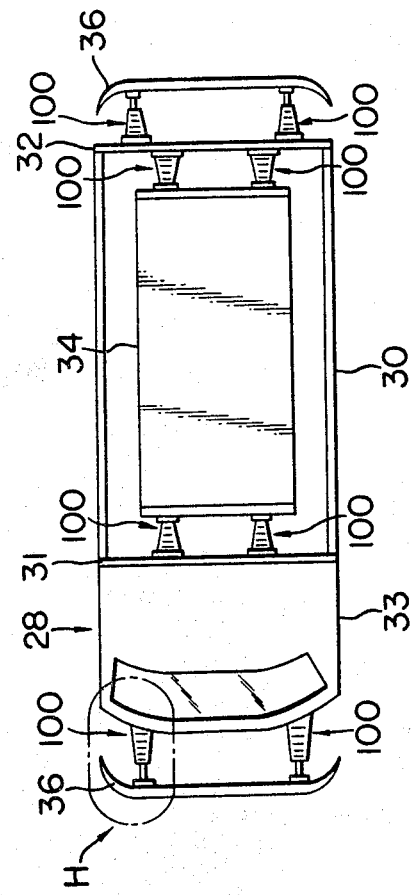
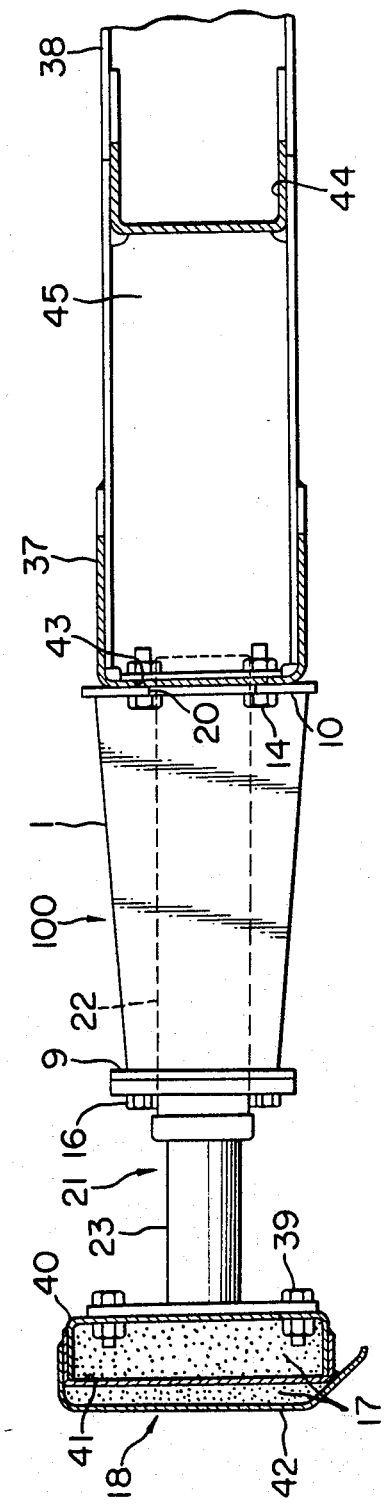
FIG. 15
FIG. 17

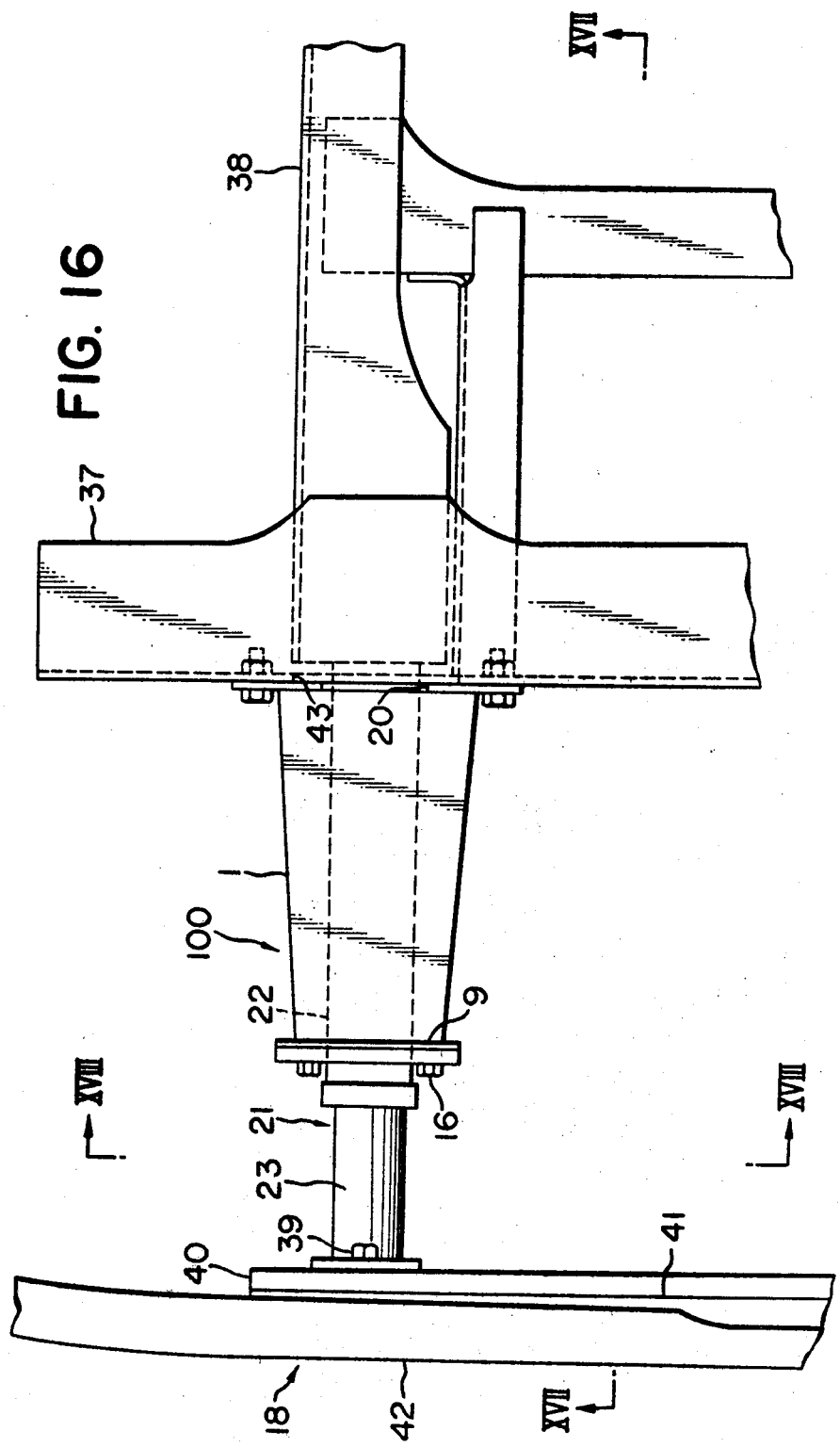

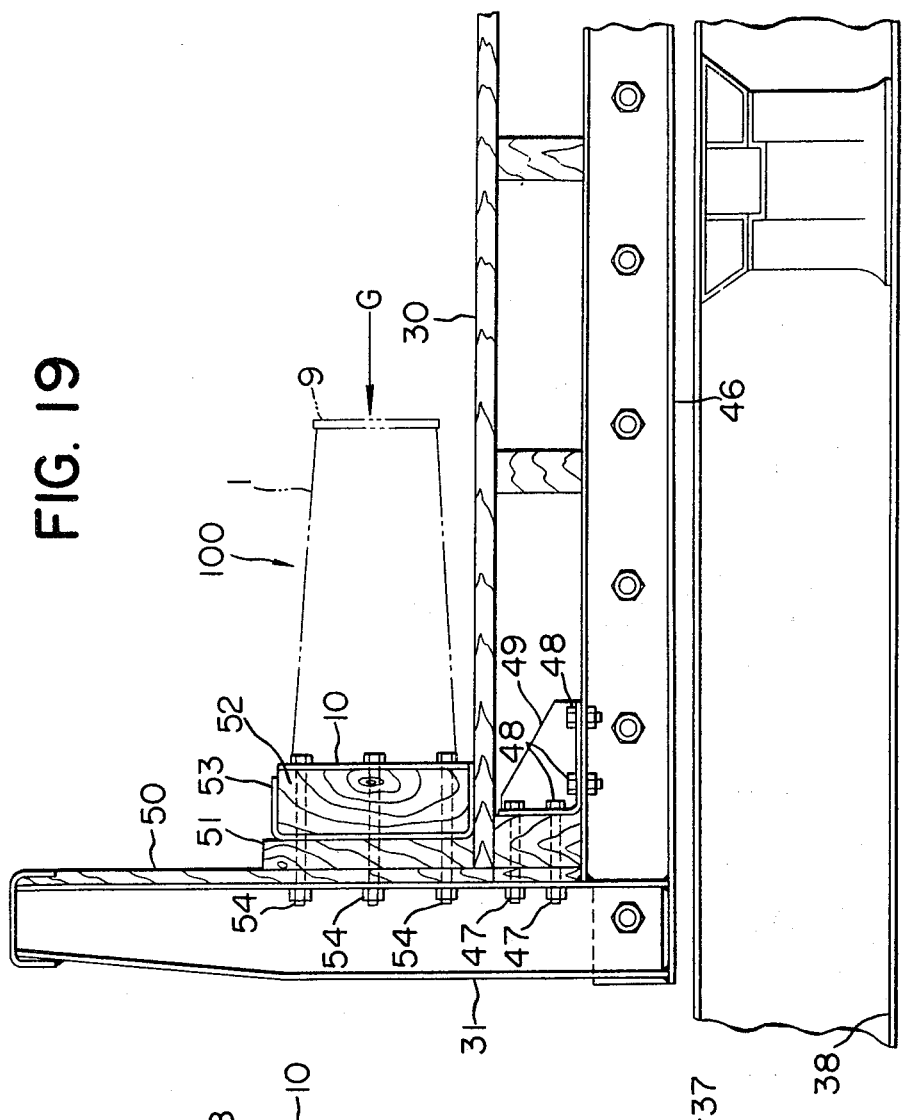
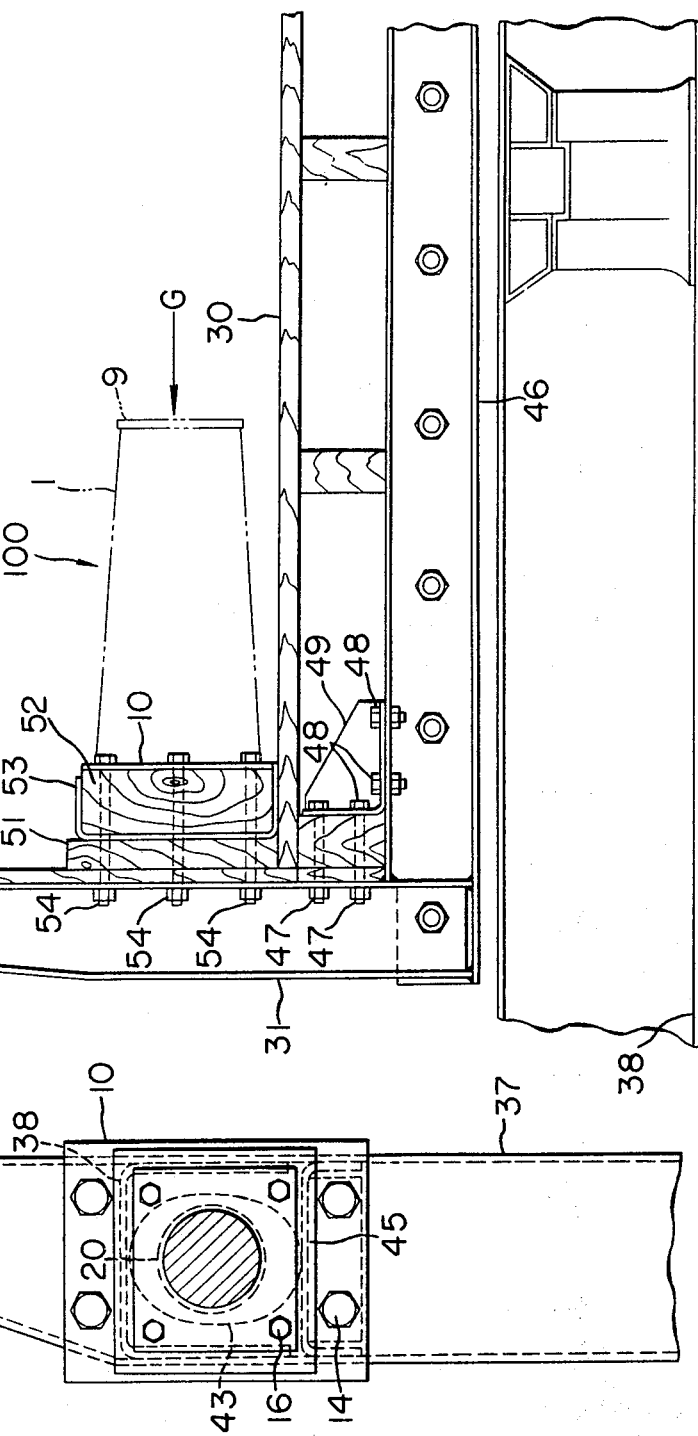

IMPACT ABSORBING DEVICE

CROSS-REFERENCE

This application is a divisional application of my previous application bearing U.S. Ser. No. 860,626, filed on Dec. 14, 1977, now U.S. Pat. No. 4,190,276, entitled "DEFORMABLE IMPACT ABSORBING DEVICE FOR VEHICLES".

BACKGROUND OF THE INVENTION

This invention relates to an impact absorbing device which is preferably mounted on an automotive vehicle for safely protecting the driver and passengers, freight and vehicle body in the event of a crash.

With the development of express highways, the pattern of traffic accidents is changing as a collision of a vehicle with another at a high speed or a collision of a vehicle with a post, a wall or like stationary structure at a high speed tends to occupy the greater proportion of traffic accidents. It is therefore strongly demanded to provide a device for securing the safety of the driver and passengers, freight and vehicle body against a large impact force externally imparted to the vehicle in the event of a crash.

SUMMARY OF THE INVENTION

It is a primary object of the present invention to provide an inexpensive impact absorbing device of simple structure which can effectively alleviate the shock due to a large impact force externally imparted thereto.

Another object of the present invention is to provide an impact absorbing device preferably mounted on a vehicle for effectively protecting the driver and passengers and/or a freight from a large impact force externally imparted to the vehicle in the event of a crash.

Still another object of the present invention is to provide an impact absorbing device which is a reliable energy absorber and which can be easily manufactured with a satisfactory uniformity in its energy absorption rate and energy absorption property.

Yet another object of the present invention is to provide an impact absorbing device which can effectively operate even when a bending stress of certain extent is produced in the device due to the impartation of an impact force in a direction deviating somewhat from or at a slight angle with respect to the axis of the device.

A further object of the present invention is to provide an impact absorbing device which can sufficiently withstand a bending load imparted in a direction lateral with respect to the impact absorbing direction.

A still further object of the present invention is to provide an impact absorbing device which can be easily replaced when damaged.

A yet further object of the present invention is to provide an impact absorbing device which can effectively alleviate an impact ranging from a large impact force to a small impact force.

In accordance with the basic aspect of the present invention, there is provided an impact absorbing device comprising a hollow polyhedral body, and a plurality of elongated cutouts formed in each of the side walls of said polyhedral body, said cutouts extending in parallel relation in a direction substantially orthogonal with respect to the longitudinal axis of said polyhedral body and each having one of its longer edges arranged to protrude outward relative to the other, whereby the energy of impact imparted in the axial direction of said polyhedral body can be absorbed by the deformation or partial breakage of the side walls of said polyhedral body.

The term "hollow polyhedral body" is used in the present application to include both a frustum of a hollow pyramid in which the sectional shape taken in a plane orthogonal with respect to its axis is polygonal and the sectional area decreases gradually along its axis, and a hollow prism in which the sectional shape taken in a plane orthogonal with respect to its axis is also polygonal and the sectional area is the same throughout the axial length.

BRIEF DESCRIPTION OF THE DRAWINGS

This invention will be explained by way of example with reference to the accompanying drawings in which;

FIG. 1 is a schematic front elevational view of a first embodiment of the impact absorbing device according to the present invention, FIG. 2 is a schematic top plan view of the embodiment shown in FIG. 1, FIG. 3 is a schematic longitudinal sectional view of part of the first embodiment, FIG. 4 shows how an impact is absorbed by the first embodiment, FIG. 5 shows a practical example in which the device according to the first embodiment is mounted on a protected body, FIG. 6 shows another practical example in which the device according to the first embodiment is mounted on a protected body, FIG. 15 is a schematic top plan view of the truck shown in FIG. 14, FIG. 16 is an enlarged detail view of the portion H in FIG. 15 to show the impact absorbing device of the present invention mounted on the front end of the chassis frame structure of the truck, FIG. 17 is a sectional view taken along the line XVII—XVII in FIG. 16, FIG. 18 is an elevational view when viewed along the line XVIII—XVIII in FIG. 16, FIG. 19 is an enlarged detail view of the portion L in FIG. 14 to show the impact absorbing device of the present invention mounted on the rear side of an auxiliary frame member erected on the front end of the freight carrier bed of the truck, FIG. 25 is a fragmentary vertical section of still another modification of the polyhedral body, and FIG. 26 is an elevation of the polyhedral body of FIG. 25.

DESCRIPTION OF THE PREFERRED EMBODIMENTS

Figure 7:
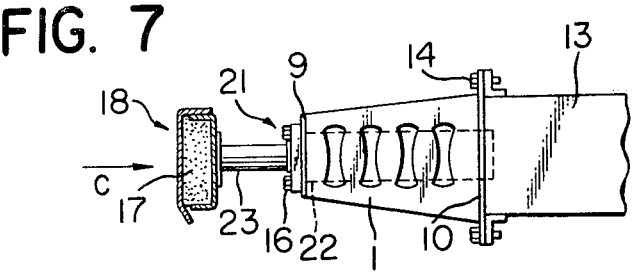
FIG. 7 is a schematic front elevational view of a second embodiment of the impact absorbing device according to the present invention.

In various embodiments of the present invention shown in the drawings, the same reference numerals are used to denote the same or substantially same parts.

Referring to FIGS. 1 to 3 showing a first embodiment of the impact absorbing device according to the present invention, the device comprises a hollow polyhedral body 1 in the form of a frustum of a hollow quadrangular pyramid which has its vertex at 9. This hollow polyhedral body 1 is obtained by forming a single plate into the hollow polyhedral shape and welding the mating edges of the plate. The joint line 2 is located at approximately the longitudinal centerline of one of the side walls of the polyhedral body 1.

A plurality of, say, four spaced elongated slots or cutouts 3 are formed in each of the four side walls of the polyhedral body 1 to extend in parallel with one another in a direction substantially orthogonal with respect to the longitudinal axis of the polyhedral body 1. Each of these cutouts 3 has a width which is narrowest in the middle portion 3' of the length and increases gradually toward the opposite ends 3".

The intermediate plate portions 6 between the cutouts 3, the plate portion 7 lying above the uppermost cutout 3, and the plate portion 8 lying beneath the lowermost cutout 3 in each side wall of the polyhedral body 1 are bent at a predetermined angle with respect to the plane of the side wall so that the upper and lower edges 4 and 5 of the cutouts 3 in FIG. 1 protrude outward and inward respectively from the side wall as best shown in FIG. 3.

A base plate or top plate 9 and another base plate or bottom plate 10 are welded to the open top and bottom respectively of the polyhedral body 1. A plurality of threaded holes 11 are bored, or formed in the top plate 9 to receive mounting bolts therein for connecting the device with a bumper or a conventional shock absorber (not shown), and a plurality of bolt holes 12 are bored in the bottom plate 10 to receive mounting bolts therein for connecting the device with a protected body 13 such as a vehicle (not shown).

The impact absorbing device is mounted on the protected body 13 in such a relation that the longitudinal axis of the polyhedral body 1 is substantially directed in a direction of impartation of an impact so that the energy of impact can be absorbed by the buckling of the polyhedral body or prisim 1. When an impact force is imparted to the polyhedral body 1 in a direction as shown by the arrow A in FIG. 1, the weakest zones B each including the cutouts 3 are successively compressed and deformed due to the impartation of the impact force. In this case, the topmost zone B having the smallest sectional area is compressed and deformed at first, and the lowermost zone B having the largest sectional area is finally compressed and deformed. Consequently, the polyhedral body 1 is deformed into a completely compressed state as shown in FIG. 4.

Thus, the energy of impact is substantially absorbed by the deformation and partial breakage of the polyhedral body 1. In this case, the polyhedral body 1 is deformed gradually from its top toward its bottom in a stable and continuous manner to ensure absorption of the energy of impact at a uniform rate during the deformation thereby effectively achieving the purpose of impact absorption.

When an impact force is imparted to the top plate 9 in a direction deviating from or at some angle with respect to the longitudinal axis of the polyhedral body 1, tending to bend the top portion of the polyhedral body 1 in a direction lateral with respect to the longitudinal axis of the polyhedral body 1, the inclining plate portions 6 are brought into engagement with each other or with the uppermost plate portions 7 or lowermost plate portions 8, and these plate portions overlap on each other to act as a deformation guide means thereby preventing the tendency of bending of the polyhedral body 1. Thus, even when an impact force is imparted to the top plate 9 in a direction deviating somewhat from or at some angle with respect to the longitudinal axis of the polyhedral body 1, the body 1 is always compressed and deformed in the manner shown in FIG. 4 thereby providing the desired stable impact absorbing effect.

FIGS. 5 and 6 show practical examples in which the impact absorbing device is mounted on a protected body 13 such as a vehicle. In these examples, the bottom plate 10 is fixed by bolts 14 to a frame member of the vehicle 13. In FIG. 5, a bumper 15 is directly attached to the top plate 9 by bolts 16, while in FIG. 6, a bumper 18 containing an elastic material 17 such as a foamed plastic material is connected to the top plate 9 by bolts 16. It will be seen from FIGS. 5 and 6, the bumper 15 or 18 or the polyhedral body 1 can be individually easily replaced by a new one when it is damaged.

Figure 8:
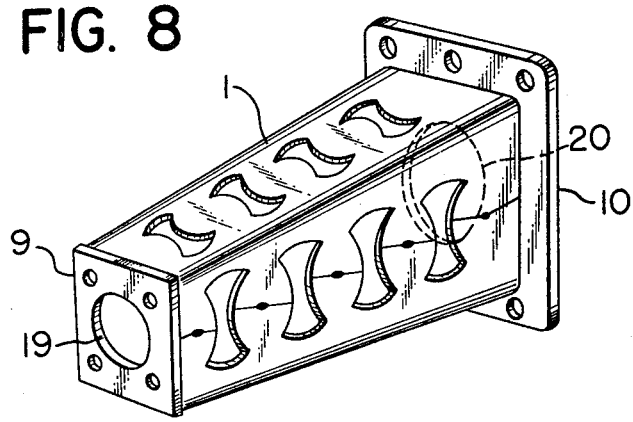
FIG. 8 is a schematic perspective view of the polyhedral body in the second embodiment shown in FIG. 7.

FIGS. 7 and 8 show a second embodiment of the present invention. Referring to FIGS. 7 and 8, circular openings 19 and 20 are bored in the center of the top plate 9 and bottom plate 10 respectively of the polyhedral body 1 in the first embodiment. A conventional fluid type shock absorber 21 is received within the polyhedral body 1, with one end of its cylinder 22 inserted in the opening 19 and fixed to the top plate 9 by bolts 16, and with the other end of the cylinder 22 inserted in the opening 20 of the bottom plate 10. The bumper 18 having the structure shown in FIG. 6 is mounted on one end of a rod 23 fixed at the other end to the piston (not shown) making sliding movement within the cylinder 22 of the shock absorber 21.

Figure 9:
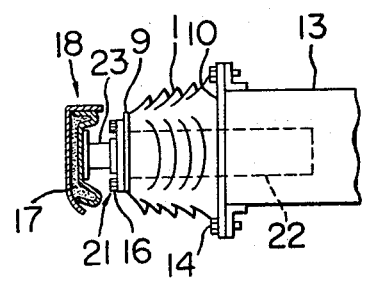
FIG. 9 shows how an impact is absorbed by the second embodiment.

When an impact force is imparted to the bumper 18 in a direction as shown by the arrow C in FIG. 7, the bumper 18 is first deformed while compressing the foamed plastic or like elastic material 17, and at the same time, the shock absorber 21 is actuated to force the rod 23 into the cylinder 22. After the rod 13 has moved over its full stroke in the cylinder 22 of the shock absorber 21, the impact force is transmitted to the top plate 9 of the polyhedral body 1 through the shock absorber 21, and the polyhedral body 1 is compressed and deformed until finally it takes a state as shown in FIG. 9. In this case, the impact energy of relatively small magnitude is absorbed by the deformation of the bumper 18 and the stroke of the shock absorber 21, and the impact energy of greater magnitude is absorbed by the deformation or partial breakage of the polyhedral body 1, so that the impact energy ranging from a relatively small magnitude to a greater magnitude can be effectively absorbed.

In this second embodiment, the associated end of the cylinder 22 of the shock absorber 21 engages with the peripheral edge of the opening 20 of the bottom plate 10 so that a portion of a bending load imparted to the bumper 18 can be supported by the bottom plate 10 when a bending force is imparted to the bumper 18, thereby increasing the mechanical strength against such a bending force. The opening 20 of the bottom plate 10 acts also as a guide means for the movement of the cylinder 22 of the shock absorber 21 during the compression and deformation of the polyhedral body 1. Thus, the opening 20 of the bottom plate 10 coacts with the inclining plate portions 6, 7 and 8 to positively restrict the direction of compression and deformation of the polyhedral body 1.

Also, in this second embodiment, the shock absorber 21 or the polyhedral body 1 can be simply individually replaced by a new one by removing the bolts 16 or the bolts 16 and 14.

Figure 10:
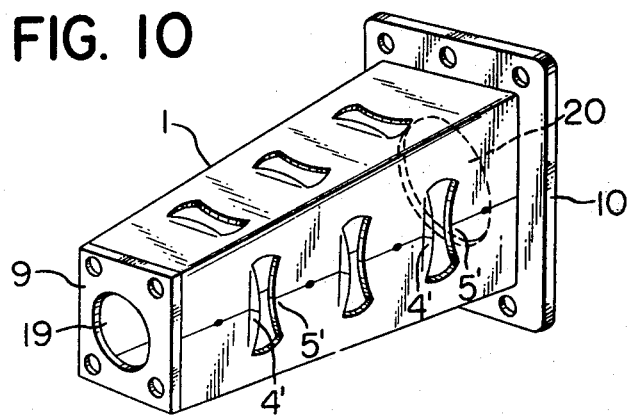
FIG. 10 is a schematic perspective view of a modification of the polyhedral body shown in FIG. 1 or 8.
Figure 11:
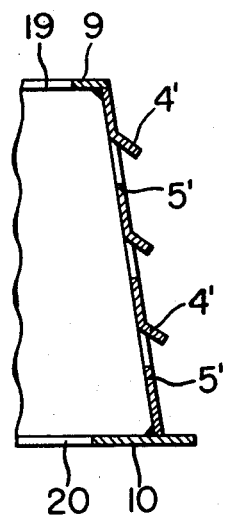
FIG. 11 is a schematic longitudinal sectional view of part of the polyhedral body shown in FIG. 10.

Although the longer edges 4 and 5 of the cutouts 3 are arranged to protrude outward and inward respectively from the side walls of the polyhedral body 1 in the illustrated embodiments, each cutout 3 may have one of its longer edges 4' protruding outward from the side wall and the other longer edge 5' not protruding in either direction as shown in FIGS. 10 and 11. Further, although not shown, each cutout 3 may have one of its longer edges 5' protruding inward from the side wall and the other longer edge 4' not protruding in either direction.

Figure 12:
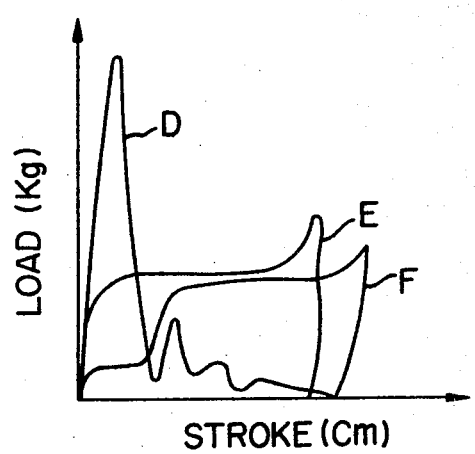
FIG. 12 is a graph showing the relation between the impact load and the stroke of the devices according to the first and second embodiments compared with a prior art device.

FIG. 12 is a graph showing, by way of example, the relation between the impact load acting upon the protected body 13 and the stroke of the impact receiving end of the bumper 18. The curve D represents the above relation when the bumper 18 is directly attached to the protected body 13 according to the prior art practice. It will be seen that, in the case of the curve D, a large load is imparted to the protected body 13 in response to the impartation of an impact force to the bumper 18, and deformation or partial breakage of the protected body 13 results due to such an impact.

The curve E represents the above relation when the bumper 18 is connected to the protected body 13 through the polyhedral body 1 according to the first example shown in FIG. 6. It will be seen that a substantially uniform load is transmitted to the protected body 13 from the beginning of deformation of the polyhedral body 1 to the end of its deformation. During this period of time, the greater portion of the impact energy is effectively absorbed by the deformation or partial breakage of the polyhedral body 1, and the remaining portion of the impact energy which has not been absorbed by the polyhedral body 1 is imparted to the protected body 13 as a load which is considerably smaller than that in the curve D but is slightly larger than that imparted to and absorbed by the polyhedral body 1.

The curve F represents the above relation when the bumper 18 is connected to the protected body 13 through the combination of the polyhedral body 1 and the shock absorber 21 according to the second example shown in FIG. 7. It will be seen that the load is small during the operation of the shock absorber 21, and a substantially uniform load slightly larger than the above value is transmitted to the protected body 13 during the absorption of the impact energy by the polyhedral body 1 following the operation of the shock absorber 21. Thus, the substantial portion of the impact energy is absorbed by the combination of the shock absorber 21 and the polyhedral body 1, and a slight load of magnitude less than that in the curve E is imparted to the protected body 13.

Figure 13:
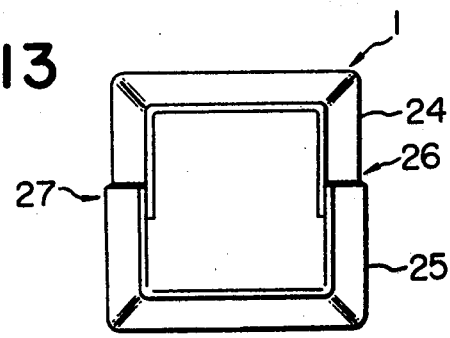
FIG. 13 shows another modification of the polyhedral body in the present invention.

The hollow polyhedral body 1 in each of the aforementioned embodiments has been illustrated in the form of a frustum of a hollow quadrangular pyramid. However, the polyhedral body 1 may be a frustum of a hollow triangular pyramid or of a hollow pentangular pyramid. Further, athough the polyhedral body 1 in the aforementioned embodiments has been formed by the butt welding on a single plate, it may be formed by applying lap welding to two U-shaped plates 24 and 25 as shown in FIG. 13. In this case, the welds 26 and 27 having an increased rigidity are located at approximately the longitudinal centerline of the opposed side walls, that is, in symmetrical relation on opposite sides of the longitudinal axis of the polyhedral body 1, so that the polyhedral body 1 is compressed and deformed symmetrically with respect to its longitudinal axis to exhibit the greatest effect of absorption of impact energy. In lieu of the two plates, four L-shaped plates may be welded together to form the polyhedral body 1.

In each of the aforementioned embodiments, the hollow polyhedral body 1 in the form of a frustum of a hollow quadrangular pyramid has been employed to withstand a bending force imparted thereto. However, the guide effect of the plate portions 6, 7 and 8 is substantially the same even when the polyhedral body 1 is in the form of a frustum of a hollow quadrangular prism or the like. In such a case, the plate thickness may be gradually varied in the axial direction of the polyhedral body 1 or the size of the outouts 3 may be gradually varied in the axial direction of the polyhedral body 1 that it can be continuously deformed.

Figure 14:
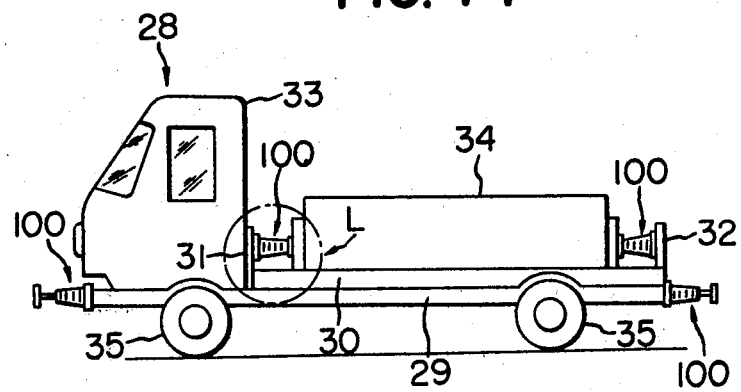
FIG. 14 is a schematic side elevational view of a truck on which a plurality of impact absorbing devices according to the present invention are mounted.

FIGS. 14 and 15 show an application of the impact absorbing device of the present invention to a truck 28. In FIGS. 14 and 15, the device is designated by the reference numeral 100. A pair of such devices 100 are shown mounted at the front end of the chassis frame structure 29 of the truck 28. Another pair of such devices 100 are shown mounted at the rear end of the chassis frame structure 29. Two pairs of such devices 100 are shown mounted on the rear end side of an auxiliary frame member 31 erected at the front end of the freight carrier bed 30 and on the front end side of another auxiliary frame member 32 erected at the rear end of the carrier bed 30, respectively. In FIGS. 14 and 15, the reference numerals 33, 34, 35 and 36 designate a cab, a freight, wheels and bumpers, respectively.

The mounting arrangement of the impact absorbing devices 100 at the front end of the chassis frame structure 29 of the truck 28, shown by H in FIG. 15, will be described in detail with reference to FIGS. 16 to 18. The mounting arrangement of the impact absorbing devices 100 on the auxiliary frame member 31 erected at the front end of the freight carrier bed 30, shown by L in FIG. 14, will be described in detail with reference to FIGS. 19 and 20.

Referring to FIGS. 16 and 18, the bottom plate 10 of one of the impact absorbing devices 100 is fixed by bolts 14 to the butt joint between a front cross member 37 and a longitudinal frame member 38 of the ladder-shaped chassis frame structure 29 of the truck 28. The cylinder 22 of the shock absorber 21 is fixed by bolts 16 to the top plate 9 of the polyhedral body 1. The bumper 18 is secured by bolts 39 to the front end of the rod 23 extending from the cylinder 22. The bumper 18 is formed by welding a pair of opposite U-shaped frame members 40 and 41, and the elastic material 17 such as the foamed plastic material is packed in the space defined between the frame members 40 and 41. The bumper 18 further includes a bumper frame member 42 welded to the frame member 41 to cover the same, and the elastic material 17 is also packed in the space defined between the members 41 and 42.

One end of the cylinder 22 of the shock absorber 21 is inserted in the circular opening 20 of the bottom plate 10 of the polyhedral body 1, and an elliptical opening 43 is bored in the front cross member 37 to receive such end of the cylinder 22 therein.

Another cross member 44 is disposed in parallel with the front cross member 37, and an auxiliary frame member 45 extends between the cross member 44 and the front cross member 37 in substantially parallel relation with the longitudinal frame member 38.

When an impact force is imparted to the front bumper 18 of the truck 28 as a result of collision of the truck 28 with another vehicle from behind, the bumper 18 is first deformed while compressing the elastic materials 17, and the shock absorber 21 is actuated so that a portion of the impact energy is absorbed by the combination of the bumper 18 and the shock absorber 21. The impact energy portion which has not been absorbed by the combination of the bumper 18 and the shock absorber 21 is imparted to the polyhedral body 1 to be absorbed by the compression and deformation or partial breakage of the polyhedral body 1, with the result that a slight energy portion left nonabsorbed even with the complete collapse of the polyhedral body 1 is merely transmitted as an impact to the truck body and driver.

In the course of the deformation of the polyhedral body 1, a large load of substantially uniform magnitude is transmitted to the front cross member 37, and when the longitudinal left and right frame members 38 are not sufficiently strong, the frame members 38 will be bent to cause dangerous deformation of the cab 33 and other parts of the truck 28. Consequently, the doors of the cab 33 will be deformed resulting in impossibility of opening the cab doors, or the front part of the cab 33 will be destroyed to impart danger to the driver. However, by virtue of the provision of the auxiliary frame members 45 which reinforce the longitudinal frame members 38, the possibility of dangerous bending of the longitudinal frame members 38 is reduced to a minimum to minimize dangerous deformation or destruction of the cab 33.

An impact force imparted to the bumper 18 may produce a bending force imparted to the rod 23 extending from the cylinder 22 of the shock absorber 21. Even in such a case, the rear end of the cylinder 22 is engaged by the peripheral edge of the circular opening 20 of the bottom plate 10 of the polyhedral body 1 to support a portion of the bending load thereby preventing the rod 23 from being bent, hence, preventing the impact absorbing device 100 from being disabled. The deformation of the polyhedral body is guided by its plate portions 6, 7 and 8, and the movement of the cylinder 22 of the shock absorber 21 is guided by the opening 20 of the bottom plate 10 of the polyhedral body 1, so that the polyhedral body 1 can be deformed into the predetermined collapsed configuration without being bent in either direction thereby carrying out the impact absorbing operation in a stable manner.

Although the rear end of the cylinder 22 of the shock absorber 21 is guided by the opening 20 bored in the bottom plate 10 of the polyhedral body 1, the elliptical opening 43 bored in the front cross member 37 may be utilized for guiding such end of the cylinder 22.

Figure 20:
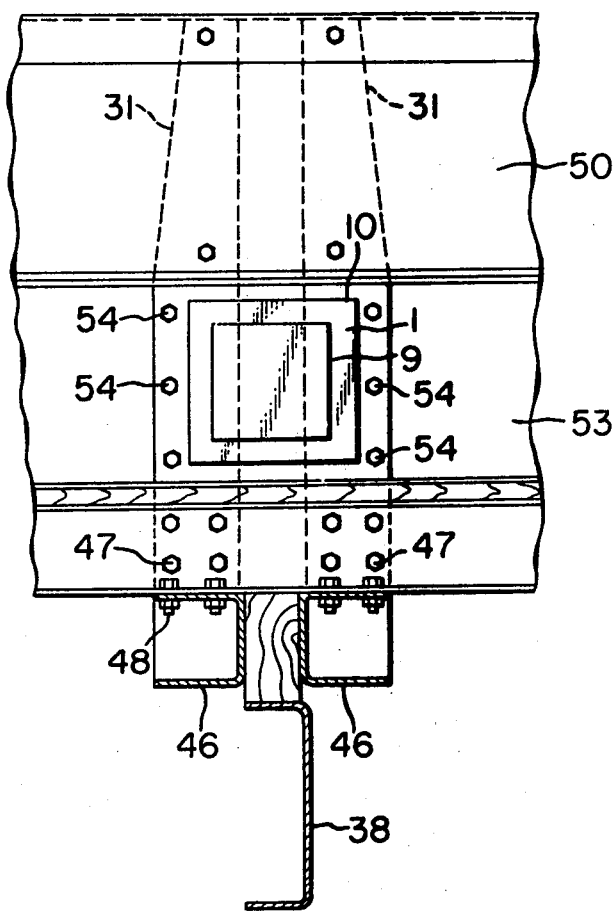
FIG. 20 is an enlarged elevational view of part of FIG. 19 when viewed in a direction shown by the arrow G.

Referring to FIGS. 19 and 20, the auxiliary frame member 31 erected at the front end of the freight carrier bed 30 is composed of a pair of frame members arranged in parallel with each other, and such frame members are rigidly welded to the front end of longitudinal frame members 46 constituting a part of the base of the freight carrier bed 30 and are also fixed by bolts 47 to a bracket 49 which is fixed to the frame members 46 by bolts 48.

The impact absorbing device 100 is mounted on the rear side of the auxiliary frame member 31 so as to protrude rearward at a predetermined height. A U-shaped frame member 53 encompasses the bottom plate 10 of the polyhedral body 1 and is fixed thereto by bolts 54 to cooperate the same. Pieces of wood 50 and 51 are interposed between the rear side of the auxiliary frame member 31 and the U-shaped frame member 53, and a piece of wood 52 is interposed between the U-shaped frame member 53 and the bottom plate 10 of the polyhedral body 1 to serve as an impact absorbing means. Although not shown, the top plate 9 of the polyhedral body 1 engages with the freight 34 directly or through a bumper or an elastic material mounted on the plate 9, or the shock absorber 21 received in the polyhedral body 1 as shown in FIG. 7 engages with the freight 34 to fix the freight 34 against dislocation.

When the truck 28 collides against a vehicle and stops abruptly, the inertia tends to dislocate the freight 34 forward or in a direction as shown by the arrow G in FIG. 19. In the event of collision, the polyhedral body 1 is deformed to absorb the energy of inertia of the freight 34 when the impact load imparted in the direction G attains a predetermined value. It is therefore possible to protect the driver from the danger and injury due to the forward dislocation of the freight 34. It is also possible to greatly alleviate the impact imparted to the freight 34 itself thereby effectively preventing a secondary accident due to the breakage or destruction of the freight 34.

It will be understood from the foregoing detailed description that the impact absorbing device according to the present invention is simple in structure and inexpensive and can be easily replaced by a new one when damaged. In addition, the device has a high efficiency of impact energy absorption and can reliably prevent impartation of an excessive impact load to a vehicle. The impact absorbing device according to the present invention can sufficiently withstand a bending force compared with prior art impact absorbing devices of the bellows type and is especially effective in protecting the driver from the danger in the event of collision between the vehicle and another. Incorporation of the device of the present invention in the steering handle mounting mechanism of a vehicle permits free forward tilting movement of the steering handle in the event of collision thereby protecting the driver from a fatal accident due to striking against the handle. Applications of the device to the front and rear bumpers and as the freight fixing means for supporting the freight at its front and rear sides or its left and right sides are also quite effective as described hereinbefore.

Figure 21:
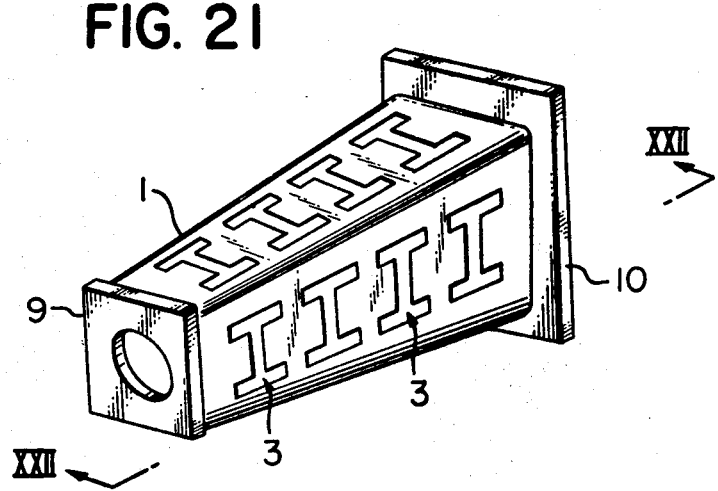
FIG. 21 is a schematic perspective view of another modification of the polyhedral body.
Figure 22:
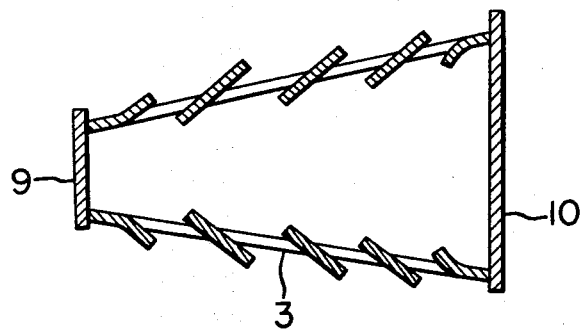
FIG. 22 is a schematic longitudinal sectional view of the polyhedral body shown in FIG. 21.
Figure 23:
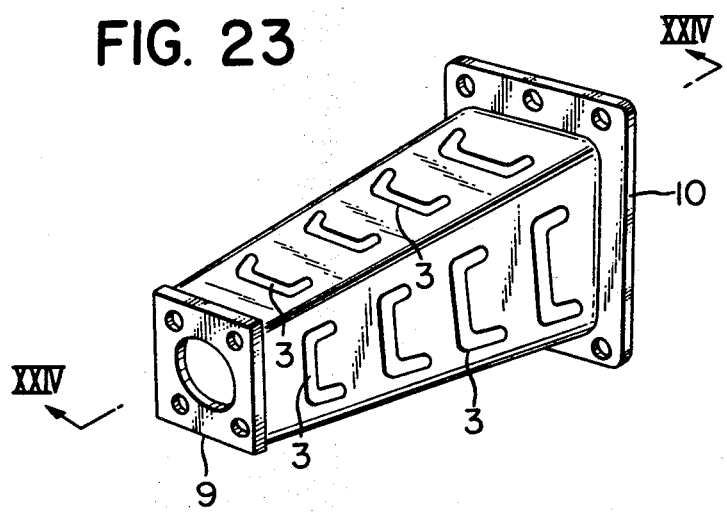
FIG. 23 is a schematic perspective view of still another modification of the polyhedral body.
Figure 24:
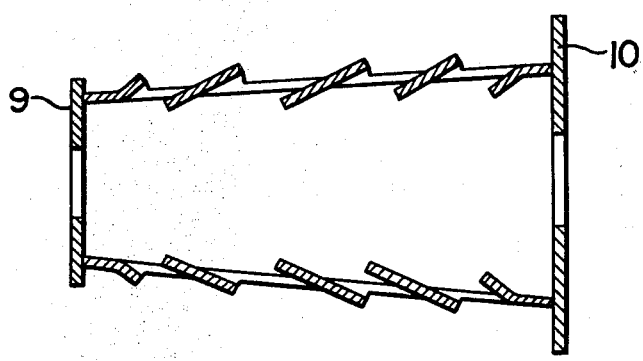
FIG. 24 is a schematic longitudinal sectional view of the polyhedral body shown in FIG. 23.

The shape of the cutouts 3 bored in the side walls of the polyhedral body 1 in the impact absorbing device according to the present invention is in no way limited to that illustrated in the aforementioned preferred embodiments. Cutouts of various shapes such as those of H-like shape as shown in FIGS. 21 and 22 and those of U-like shape as shown in FIGS. 23 and 24 can be equally effectively employed in the present invention.

While several complete embodiments of the invention have been disclosed herein, it will be appreciated that modification of these particular embodiments of the invention may be resorted to without departing from the scope of the invention.

What is claimed is:

1. An impact absorbing device comprising a hollow polyhedral body, a plurality of elongated cutouts formed in each of the side walls of said polyhedral body, said cutouts extending in parllel relation in a direction substantially orthogonal with respect to the longitudinal axis of said polyhedral body; means for guiding continuous deformation of said polyhedral body in the direction of its longitudinal axis by compression forces, each said cutout having one of its longer edges arranged to protrude outward relative to the other, whereby the energy of impact imparted in the axial direction of said polyhedral body can be absorbed by the deformation or partial breakage of the side walls of said polyhedral body; and a shock absorber having an impact attenuating capability less than that of said polyhedral body is mounted in said polyhedral body with its axis aligning substantially with the longitudinal axis of said polyhedral body to absorb the energy of less impact than a predetermined magnitude, said polyhedral body absorbing the portion of the energy of impact exceeding the predetermined magnitude.

2. An impact absorbing device comprising a unitary hollow polyhedral body having planar side walls and a longitudinal axis, a plurality of elongated cutouts formed in each of said side walls of said polyhedral body and extending in parallel relation in a direction substantially orthogonal with respect to the longitudinal axis of said polyhedral body, said cutouts each having a pair of opposed longer edges extending substantially orthogonal of said longitudinal axis, and means for guiding continuous deformation of said polyhedral body on its longitudinal axis by compression forces including each said cutout having one of its longer edges protruding outwardly relative to the other longitudinal edge of the same cutout whereby the energy of impact imparted in an axial direction of said polyhedral body can be absorbed by the deformation of the side walls of said polyhedral body and axial compaction of said body; and a shock absorber having an impact attenuating capability less than that of said polyhedral body is mounted in said polyhedral body with its axis aligning substantially with the longitudinal axis of said polyhedral body to absorb the energy of impact less than a predetermined magnitude, said polyhedral body absorbing the portion of the energy of impact exceeding the predetermined magnitude.

3. An impact absorbing device as claimed in claim 1 or 2, wherein said polyhedral body is connected at one end thereof with the front or rear end of a chassis frame structure of a vehicle, and a bumper is connected with the impact receiving end of said shock absorber.

4. An impact absorbing device as claimed in claim 1 or 2, wherein said shock absorber is of the fluid type including a fluid cylinder and a piston, said cylinder of said shock absorber mounted in said polyhedral body being fixed at one end thereof in one end of said polyhedral body, and a rod connected with said piston extends to the exterior of said polyhedral body.

5. An impact absorbing device as claimed in claim 4, wherein a base plate having a central circular opening is secured to the end of said polyhedral body remote from the end having one end of said cylinder of said shock absorber fixed therein so as to receive the other end of said cylinder of said shock absorber in said circular opening, whereby upon impartation of the energy of impact to said rod of said shock absorber, a portion of a bending load tending to bend said shock absorber, hence, said polyhedral body relative to its axial direction is supported by the engagement of the other end of said cylinder of said shock absorber with the peripheral edge of said circular opening, and said circular opening acts also as a means for guiding the movement of said shock absorber during the compression and deformation of said polyhedral body.

6. An impact absorbing device as claimed in claim 1 or 2, wherein said polyhedral body is connected at the end, remote from the end having one end of said cylinder of said shock absorber fixed therein, with the rear or front side of an auxiliary frame member erected at the front or rear end of a freight carrier bed of a vehicle, and the other end of said polyhedral body having said rod of said shock absorber extending therefrom is disposed opposite to the freight to fix the freight against dislocation and prevent an impact from being imparted to the freight.

7. An impact absorbing device as claimed in claim 6, wherein said one end of said polyhedral body is detachably fixed to said auxiliary frame member by bolts.

8. An impact absorbing device as claimed in claim 3, wherein said polyhedral body is connected at one end thereof with a front or rear cross member of the chassis frame structure, and said chassis frame structure includes an auxiliary frame member extending in substantially parallel relation with a longitudinal frame member between said cross member and another cross member disposed in rearwardly or forwardly adjacent and parallel relation to said cross member.

9. An impact absorbing device as claimed in claim 4, wherein said polyhedral body is connected at the end, remote from the end having one end of said cylinder of said shock absorber fixed therein, with the front or rear side of a frame member of a chassis frame structure of a vehicle, and an opening having an inner diameter slightly larger than the outer diameter of said cylinder of said shock absorber is bored in said frame member to receive the other end of said cylinder of said shock absorber therein.

10. An impact absorbing device as claimed in claim 1 or 2, wherein said shock absorber is of the fluid type including a fluid cylinder and a piston, said cylinder of said shock absorber mounted in said polyhedral body being fixed at one end thereof in one end of said polyhedral body, a piston rod connected with said piston extends to the exterior of said polyhedral body, a bumper operatively engaged by the end of said piston rod extending from said polyhedral body, and said polyhedral body is connected at the end, remote from the end having one end of said cylinder of said shock absorber fixed therein, with a frame member of a chassis frame structure of a vehicle.

11. An impact absorbing device as claimed in claim 1, wherein said hollow polyhedral body is in the form of a frustum of a hollow pyramid, said cutouts including end portions extending in the direction of the longitudinal axis of said polyhedral body.

* * * * *